United States Patent
Ichinose et al.

[11] Patent Number: 6,066,268
[45] Date of Patent: May 23, 2000

[54] LIQUID-CRYSTALLINE MEDIUM

[75] Inventors: Hideo Ichinose; Yuka Ikedo; Yasuyoshi Namiki; Shinji Nakajima; Akiko Takashima, all of Kanagawa Pref., Japan; Kazuaki Tarumi, Seeheim-Jugenheim, Germany; Brigitte Schuler, Grossostheim, Germany; Volker Reiffenrath, Rossdorf, Germany

[73] Assignee: Merck Patent Gesellschaft Mit Beschrankter Haftung, Germany

[21] Appl. No.: 09/143,112

[22] Filed: Aug. 28, 1998

[30] Foreign Application Priority Data

Aug. 29, 1997 [EP] European Pat. Off. ............... 97115000
Nov. 12, 1997 [EP] European Pat. Off. ............... 97119784

[51] Int. Cl.[7] .......................... C09K 19/30; C09K 19/12; G02F 1/13
[52] U.S. Cl. ................ 252/299.63; 252/299.66; 428/1.1
[58] Field of Search .......................... 252/299.63, 299.66, 252/299.01; 348/790; 349/5; 428/1.1

[56] References Cited

FOREIGN PATENT DOCUMENTS 98-27036  6/1998  WIPO .

OTHER PUBLICATIONS

Caplus 1998: 724165, 1998.

*Primary Examiner*—Shean C. Wu
*Attorney, Agent, or Firm*—Millen, White, Zelano & Branigan, P.C.

[57] ABSTRACT

The invention relates to a liquid-crystalline medium based on a mixture of polar compounds having negative dielectric anisotropy, which contains at least one compound of formula I

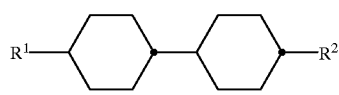

and at least one compound of formula II

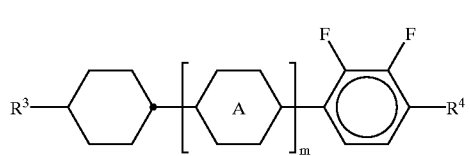

wherein
$R^1$ is alkyl or alkoxy with 1 to 8 C atoms or alkenyl with 2 to 7 C atoms,
$R^2$ is alkenyl with 2 to 7 C atoms,
$R^3$ and $R^4$ are each independently alkyl or alkoxy with 1 to 8 C atoms,

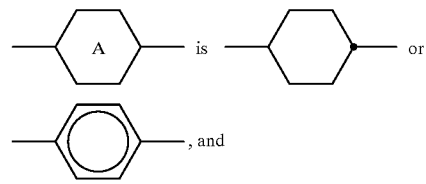

m is 0 or 1.

19 Claims, No Drawings

LIQUID-CRYSTALLINE MEDIUM

The invention relates to a liquid-crystalline medium based on a mixture of polar compounds having negative dielectric anisotropy, which contains at least one compound of formula I

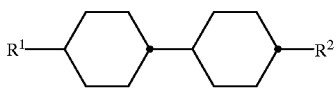

and at least one compound of formula II

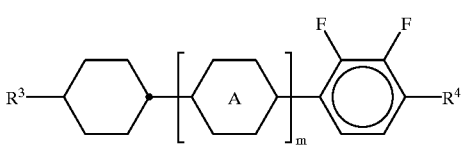

wherein
  $R^1$ is alkyl or alkoxy with 1 to 8 C atoms or alkenyl with 2 to 7 C atoms,
  $R^2$ is alkenyl with 2 to 7 C atoms,
  $R^3$ and $R^4$ are each independently alkyl or alkoxy with 1 to 8 C atoms,

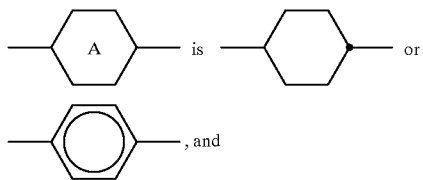

m is 0 or 1,
in particular for electro-optical displays having active matrix addressing based on the ECB effect.

The principle of electrically controlled birefringence, the ECB effect, or the DAP effect (deformation of aligned phases) was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

Papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta \epsilon$ of −0.5 to −5 in order to be usable for high-information display elements based on the ECB effect. Electro-optical display elements based on the ECB effect have homeotropic or homeotropic tilted edge alignment.

The industrial application of this effect in electro-optical display elements requires LC phases which must satisfy a multiplicity of requirements. Particularly important here are chemical resistance to moisture, air and physical effects such as heat, radiation in the infra-red, visible and ultra-violet regions and direct and alternating electrical fields. Furthermore, LC phases which can be used industrially need a liquid-crystalline mesophase in a suitable temperature range and low viscosity.

None of the series of compounds having a liquid-crystalline mesophase which have been disclosed hitherto includes a single compound which meets all these requirements. Generally, therefore, mixtures of from two to 25, preferably from three to 18, compounds are prepared to give substances which can be used as LC phases. However, ideal phases cannot easily be produced in this way, since liquid-crystal materials having substantially negative dielectric anisotropy and adequate long-term stability were hitherto not available.

Matrix liquid-crystal displays (MLC displays) are known. Examples of nonlinear elements which can be used to individually switch the individual pixels are active elements (i.e. transistors). This is then referred to as an "active matrix", and a differentiation can be made between two types:
  1. MOS (metal oxide semiconductor) transistors on silicon wafers as substrate,
  2. Thin-film transistors (TFT) on a glass plate as substrate.

In the case of type 1, the electro-optical effect used is usually dynamic scattering or the guest-host effect. The use of monocrystalline silicon as substrate material restricts the display size, since even the modular assembly of various part-displays results in problems at the joins.

In the case of the more promising type 2, which is preferred, the electro-optical effect used is usually the TN effect. A distinction is made between two technologies: TFTs comprising compound semi-conductors, such as, for example, CdSe, or TFTs based on polycrystalline or amorphous silicon. Intensive research efforts are being made worldwide in the latter technology.

The TFT matrix is applied to the inside of one glass plate of the display, while the inside of the other glass plate carries the transparent counter-electrode. Compared with the size of the pixel electrode, the TFT is very small and has virtually no adverse effect on the image. This technology can also be extended to fully colour-compatible image displays, in which a mosaic of red, green and blue filters is arranged in such a manner that each filter element is located opposite a switchable pixel.

The TFT displays disclosed hitherto usually operate as TN cells with crossed polarizers in transmitted light and are illuminated from the back.

The term MLC display here covers any matrix display containing integrated nonlinear elements, i.e. in addition to the active matrix, also displays containing passive elements such as varistors or diodes (MIM=metal-insulator-metal).

MLC displays of this type are particularly suitable for TV applications (for example pocket TV sets) or for high-information displays in automobile or aircraft construction. In addition to problems with respect to the angle dependence of the contrast and the response times, difficulties occur in MLC displays due to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. As the resistance decreases, the contrast of an MLC display worsens. Since the resistivity of the liquid-crystal mixture generally decreases over the life of an MLC display due to interaction with the internal surfaces of the display, a high (initial) resistance is very important for displays which must have acceptable resistance values over a long operating period.

The disadvantage of the MLC-TN displays disclosed hitherto is due to their comparatively low contrast, the relatively high viewing angle dependence and the difficulty of producing grey shades in these displays.

EP 0 474 062 discloses MLC displays based on the ECB effect. The LC mixtures described therein are based on 2,3-difluorophenyl derivatives containing an ester, ether or ethyl bridge and have low values for the "voltage holding ratio" (HR) after exposure to UV and therefore cannot be used for displays of the projection type.

Thus, there continues to be a great demand for MLC displays having very high resistivity at the same time as a wide operating temperature range, short response times and low threshold voltage, with the aid of which various grey shades can be produced.

The invention has the object of providing MLC displays, in particular projection displays, based on the ECB effect which do not have the abovementioned disadvantages, or do so only to a reduced extent, and at the same time have very high resistivities.

It has now been found that this object can be achieved if nematic liquid-crystal mixtures containing at least one compound of the formula I and at least one compound of the formula II are used in these display elements.

The invention thus relates to a liquid-crystalline medium based on a mixture of polar compounds having negative dielectric anisotropy, which contains at least one compound of formula I

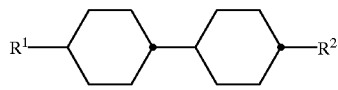

I and at least one compound of formula II

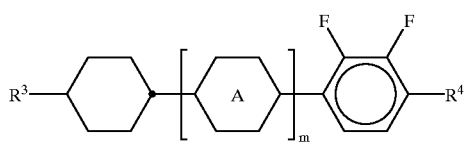

II wherein
$R^1$ is alkyl or alkoxy with 1 to 8 C atoms or alkenyl with 2 to 7 C atoms,
$R^2$ is alkenyl with 2 to 7 C atoms,
$R^3$ and $R^4$ are each independently alkyl or alkoxy with 1 to 8 C atoms,

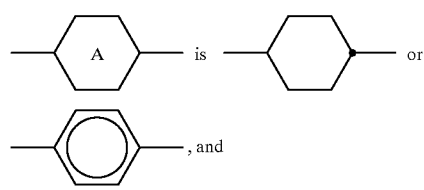

m is 0 or 1.
Preferred embodiments are:
a) A medium which contains one or more compounds of formula I in which $R^1$ is alkyl or alkoxy with 1 to 8 C atoms and
$R^2$ is alkenyl with 1 to 7 C atoms.
b) A medium which contains one or more compounds of formula I in which
$R^1$ and $R^2$ are independently alkenyl with 2 to 7 C atoms.
c) A medium which optionally contains additionally one or more compounds of the formula III:

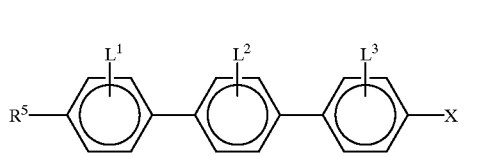

III in which
$R^5$ is alkyl or alkoxy with 1 to 8 C atoms,
$L^1$ to $L^3$ are each independently H, F or Cl, and
X is F or Cl.
d) A medium which additionally contains one or more compounds of the formula IV:

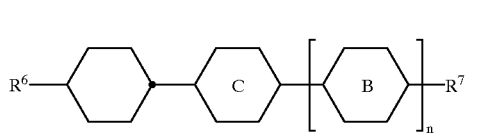

IV in which
$R^6$ and $R^7$ are each independently alkyl or alkoxy with 1–8 C atoms, and one of $R^6$ and $R^7$ optionally also alkenyl with 2–7 C atoms,

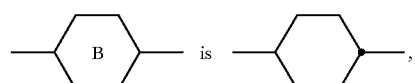

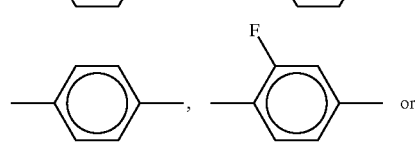

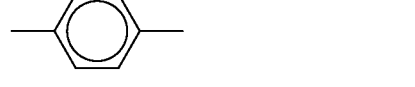

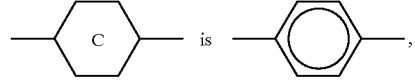

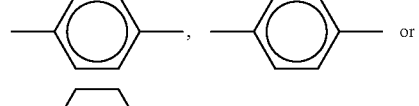

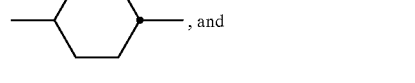

n is 0 or 1.
e) A medium which contains a compound of the formula IV according to the preferred embodiment d) above, in which $R^6$ and $R^7$ are independently of one another alkyl or alkoxy with 1 to 8 C atoms, m is 0 or 1

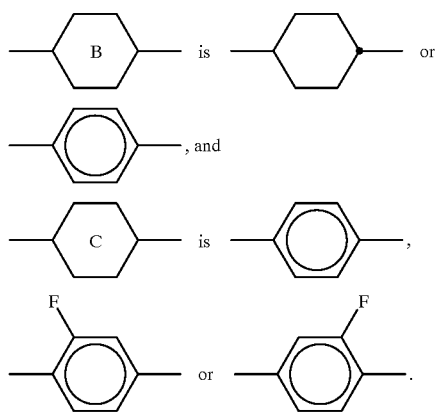

f) A medium which essentially comprises 4 or more compounds selected from the formulae I and II, 3 or more compounds of the formula IV and/or at least one compound of the formula III.

g) A medium containing at least three compounds of the formula II.

h) A medium in which the proportion of compounds of the formula I in the mixture as a whole is from 2% to 40% and preferably from 2% to 30% by weight.

i) A medium in which the proportion of compounds of the formula II in the mixture as a whole is at least 40% by weight.

j) A medium in which the proportion of compounds of the formula III in the mixture as a whole is from 0% to 15% preferably from 2% to 15% by weight.

k) A medium which contains one or more compounds of formula I according to preferred embodiment b) above, in which the proportion of compounds of the formula III in the mixture as a whole is from 2% to 15% by weight.

l) A medium, according to embodiment a) above, containing at least one compound of formula I wherein $R^1$ is n-alkyl and $R^2$ is vinyl, 1E-propenyl, 1E-butenyl, 3E-butenyl or 3E-pentenyl, in particular vinyl or 1E-propenyl.

m) A medium, according to embodiment b) above, containing at least one compound of formula I wherein $R^1$ and $R^2$ are each independently vinyl, 1E-propenyl, 1E-butenyl, 3E-butenyl or 3E-pentenyl, in particular vinyl.

n) A liquid-crystalline medium, according to embodiment m) above, containing at least one compound selected from the formulae Ia to Ih:

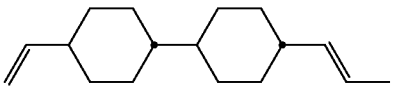

Ia

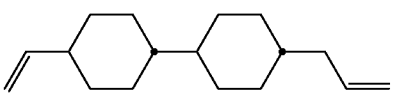

Ib

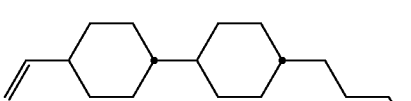

Ic

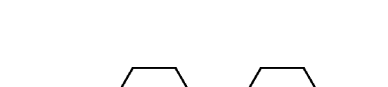

Id

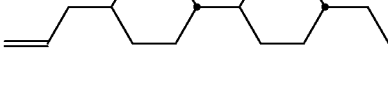

Ie

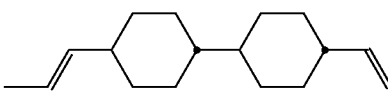

If

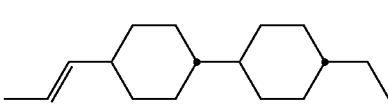

Ig

Ih

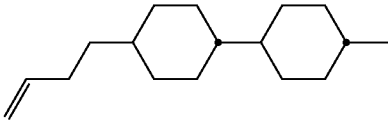

o) A liquid-crystalline medium containing at least three compounds selected from compounds of the formulae IIa to IIe

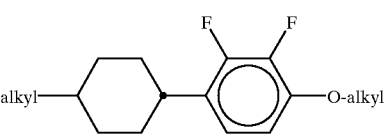

IIa

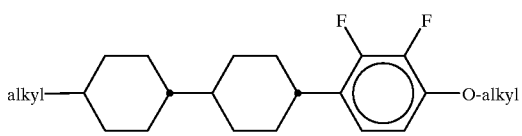

IIb

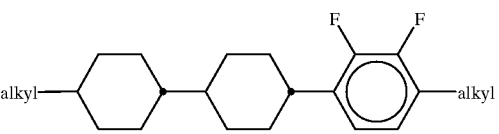

IIc

-continued

IId

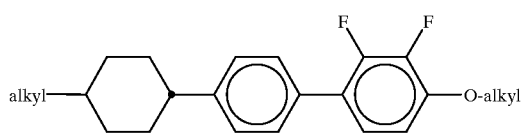

IIe

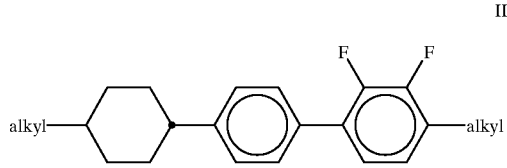

in which alkyl is $C_1$ to $C_6$-alkyl,
in particular containing at least one compound of the formula IIa, at least 1 compound of the formula IIb, and/or at least 1 compound of the formula IIc.

p) A liquid crystalline medium, according to embodiment c) above, containing at least one compound selected from the formulae IIIa to IIId IIIa

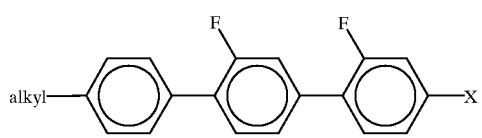

IIIb

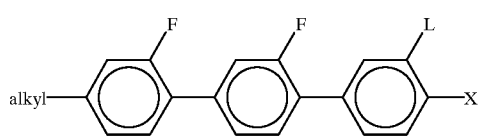

IIIc

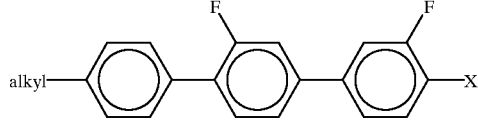

IIId

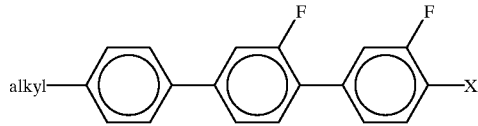

wherein alkyl is $C_{1-6}$-alkyl, L is H or F and X is F or Cl, in particular containing at least one compound of formula IIIa and/or at least one compound of formula IIIb wherein X is preferably Cl and L is preferably H.

q) A liquid crystalline medium containing at least three compounds selected from the formulae IVa to IVd IVa

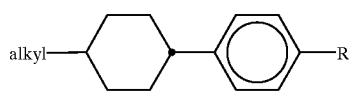

-continued

IVb

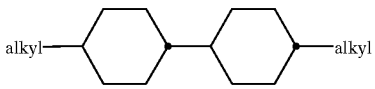

IVc

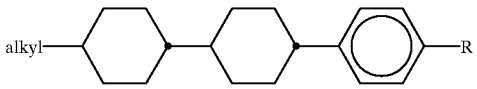

IVd

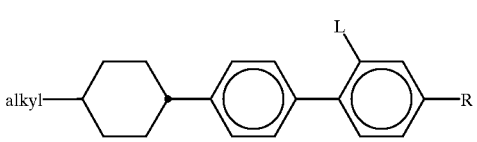

wherein alkyl is $C_1$ to $C_6$-alkyl, R is $C_1$ to $C_6$-alkyl or -alkoxy and L is H or F.

r) A liquid-crystalline medium essentially comprising:
2–30% by weight of one or more compounds of the formula I, especially of compounds according to preferred embodiment a) above,
40–85% by weight of one or more compounds of the formula II,
0–15% by weight of one or more compounds of the formula III, and
5–40% by weight of one or more compounds of the formula IV.

s) A liquid-crystalline medium essentially comprising:
10–40% by weight of one or more compounds of the formula I, especially of compounds according to preferred embodiment b) above,
40–85% by weight of one or more compounds of the formula II,
0–15% by weight of one or more compounds of the formula III, and
0–40% by weight of one or more compounds of the formula IV.

t) Alkyl and/or alkoxy is preferably a straight-chained alkyl or alkoxy residue having 1 to 6 preferably 1 to 5 carbon atoms.

The invention furthermore relates to an electro-optical projection display having active matrix addressing based on the ECB effect, characterized in that it contains, as dielectric, a liquid-crystalline medium as described above.

The liquid-crystal mixture preferably has a nematic phase range of at least 80 degrees (centigrade), a clearing point above 60° C., in particular above 70° C., and a maximum flow viscosity of $\leq 60$ mm²s⁻¹, preferably of 20 mm²s⁻¹ to 60 mm²s⁻¹ at 20° C. and a rotational viscosity of $\leq 180$ mPa.s, preferably of $\leq 160$ mPa.s and in particular of 85 mPa.s to 160 mPa.s at 20° C.

The liquid-crystal mixture according to the invention has a $\Delta\epsilon$ of from about −1.5 to −5, in particular from about −1.8 to −4, where $\Delta\epsilon$ denotes the dielectric anisotropy.

The birefringence $\Delta n$ of the liquid-crystal mixture is generally between 0.07 and 0.14, preferably between 0.08 and 0.13, and/or the dielectric constant $\epsilon\|$ is greater than or equal to 3, preferably from 3.2 to 4.5.

The capacitive threshold voltage $V_o$ at a frequency of 1 kHz is 2.5 V or less, preferably 2.4 V or less and most preferably 1.9 V to 2.3 V.

The dielectrics may also contain further additives known to the person skilled in the art and described in the literature.

For example, 0–15% of pleochroic dyes can be added, furthermore conductive salts, preferably ethyidimethyidodecylammonium 4-hexoxybenzoate, tetrabutylammonium tetraphenylborate or complex salts of crown ethers (cf. for example, Haller et al., Mol. Cryst. Liq. Cryst. Volume 24, pages 249–258 (1973)) in order to improve the conductivity or substances can be added in order to modify the dielectric anisotropy, the viscosity and/or the alignment of the nematic phases. Such substances are described, for example, in DE-A 22 09 127, 22 40 864, 23 21 632, 23 38 281, 24 50 088, 26 37 430 and 28 53 728.

The individual components of the formulae I to IV of the liquid-crystal phases according to the invention are either known or their methods of preparation can easily be derived from the prior art by a person skilled in the relevant art, since they are based on standard methods described in the literature.

Corresponding compounds of the formula I are described, for example, in EP 0 122 389 and EP 0 168 683.

Corresponding compounds of the formula II are described, for example, in EP 0 364 538.

Corresponding compounds of the formula III are described, for example, in U.S. Pat. No. 5,328,644.

Corresponding compounds of the formula IV are described, for example, in EP 0 132 553, DE 26 36 684 and EP 0 022 183.

The term "alkenyl" in formula I comprises straight chain and branched alkenyl groups with 2 to 7 C atoms. Straight chain alkenyl groups are preferred. Further preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl.

Of these, especially preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z,hexenyl, 4E-hexenyl, 4Z-heptenyl, 5-hexenyl and 6-heptenyl. Alkenyl groups with up to 5 C atoms are particularly preferred.

The nematic liquid-crystal mixtures of the displays according to the invention preferably contain 2 to 15% of compounds of the formula I, particularly preferably from 3 to 10% of compounds of the formula I, preferably according to preferred embodiment a) above.

The mixtures preferably contain 4 to 20, in particular 5 to 15, compounds of the formulae I, II, III and IV.

In addition to compounds of the formulae I to IV, other constituents may also be present, for example in an amount of up to 45% of the mixture as a whole, but preferably up to 34%, in particular up to 10%.

The other constituents are preferably selected from nematic or nemato-genic substances, in particular known substances, from the classes consisting of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-bis-cyclohexylbiphenyls or cyclohexylpyrimidines, phenyl- or cyclohexyldioxanes, optionally halogenated stilbenes, benzyl phenyl ethers, tolans and substituted cinnamic acids.

The most important compounds which are suitable as components of liquid-crystalline phases of this type can be characterized by the formula V $$R^8-L-G-E-R^9 \qquad V$$

in which L and E are each a carbocyclic or heterocyclic ring system from the group comprising 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G is | —CH=CH— | —N(O)=N— |
|---|---|---|
| | —CH—CQ- | —CH=N(O)— |
| | —C≡C— | —CH$_2$—CH$_2$— |
| | —CO—O— | —CH$_2$—O— |
| | —CO—S— | —CH$_2$—S— |
| | —CH=N— | —COO—Phe-COO— | or a C—C single bond, Q is halogen, preferably chlorine, or —CN, and $R^8$ and $R^9$ are each alkyl, alkoxy, alkanoyloxy or alkoxycarbonyloxy having up to 18, preferably up to 8 carbon atoms, or one of these radicals is alternatively CN, NC, $NO_2$, $CF_3$, F, Cl or Br.

In most of these compounds $R^8$ and $R^9$ are different from one another, one of these radicals usually being an alkyl or alkoxy group. Other variants of the proposed substituents are also common. Many such substances or mixtures thereof are commercially available. All these substances can be prepared by methods which are known from the literature.

The structure of the liquid-crystal displays according to the invention corresponds to the conventional geometry, as described, for example, in EP-A 0 240 379.

The entire disclosure of all applications, patents and publications, cited above and below, and of corresponding European Application No. 97115000.8, filed Aug. 29, 1997 and European Application No. 97119784.3, filed Nov. 12, 1997, is hereby incorporated by reference.

The examples below are intended to illustrate the invention without representing a limitation. Above and below, percentages are by weight; all temperatures are given in degrees celsius, temperature differences are given in differences of degrees celsuis. All physical data are given for 20° C. unless explicitly stated otherwise.

Preferred mixtures contain at least one compound of the compounds listed in the following:

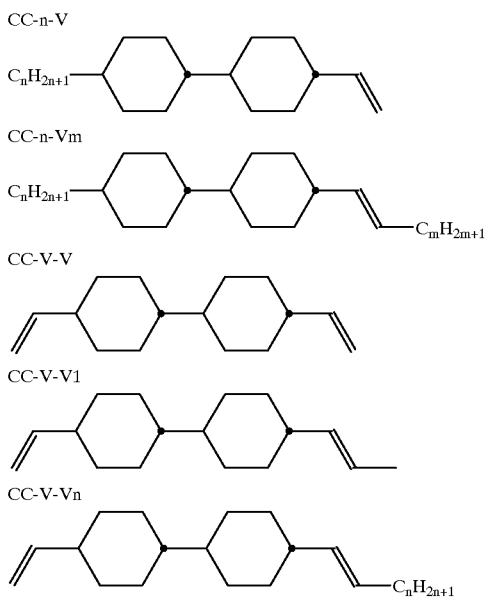

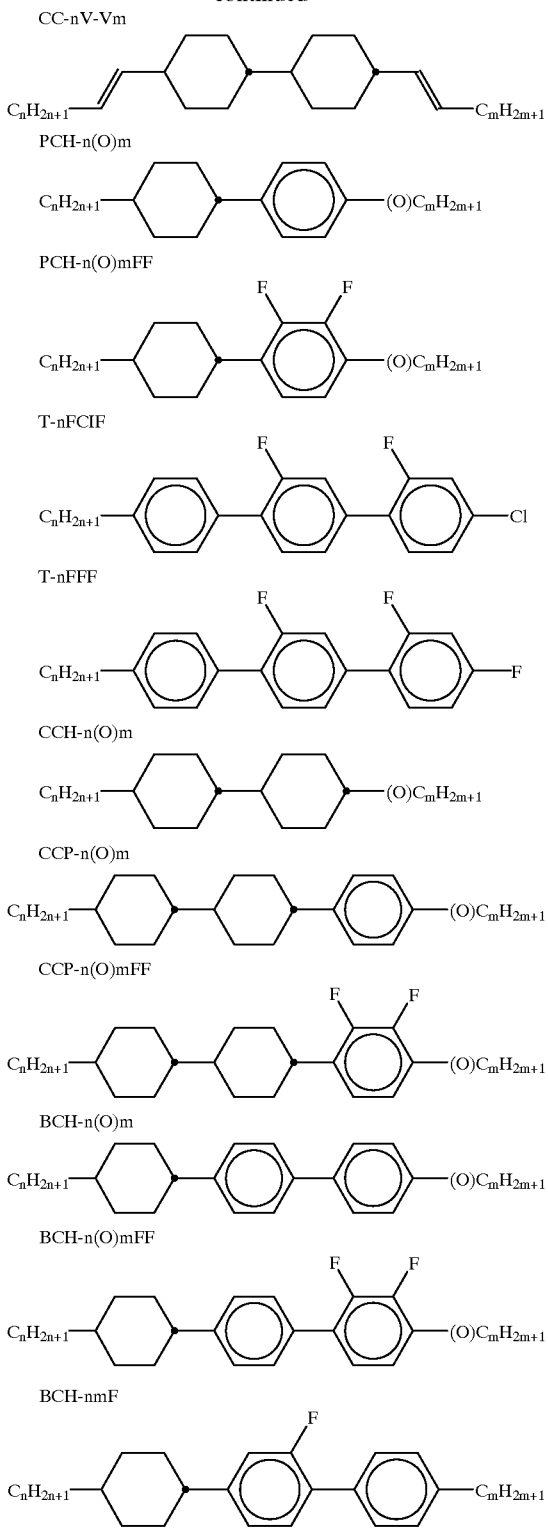

In addition in the examples as well as in the text of this application, unless explicitly stated otherwise:

$\Delta n$ denotes the optical anisotropy measured at 20° C. and 589 nm, $n_e$ denotes the extraordinary refractive index at 20° C. and 589 nm, $\Delta \epsilon$ denotes the dielectric anisotropy at 20° C. and 1 kHz, $\epsilon_\parallel$ denotes the dielectric constant in the parallel direction to the molecular axis at 20° C. and 1 kHz, $V_o$ the capacitive threshold, root mean square of a rectangular DC voltage, at 20° C. and 1 kHz, cp. denotes the clearing point [° C.], S,N the temperature limit for the occurrence of a smectic or a crystalline phase, $\upsilon$ denotes the flow viscosity at the temperature given in ° C. [mm$^2$s$^{-1}$], $\gamma_1$ denotes the rotational viscosity at the temperature given [mPa.s].

The display used for measurement of the threshold voltage has two plane-parallel outer plates at a separation of 5.0 μm and, on the inside of the outer plates, electrode layers with lecithin alignment layers on top which cause a homeotropic alignment of the liquid crystals.

EXAMPLE 1

A mixture is prepared which comprises

| | | | |
|---|---|---|---|
| CC-5-V | 5.00% | cp. | 84° C. |
| CCP-21FF | 6.50% | $\Delta n$ | 0.1121 |
| CCP-31FF | 6.50% | $n_e$ | 1.5991 |
| CCP-302FF | 14.00% | $\Delta \epsilon$ | -3.7 |
| CCP-502FF | 9.50% | $\epsilon_\parallel$ | 3.8 |
| PCH-302FF | 14.50% | | |
| PCH-502FF | 14.50% | | |
| T-3FClF | 3.00% | | |
| T-5FClF | 3.00% | | |
| BCH-32 | 5.00% | | |
| BCH-52 | 3.00% | | |
| BCH-32F | 4.00% | | |
| BCH-52F | 3.50% | | |
| PCH-32 | 2.00% | | |
| PCH-301 | 2.00% | | |
| PCH-302 | 2.00% | | |
| PCH-304 | 2.00% | | |

EXAMPLE 2

A liquid-crystalline phase is prepared which comprises

| | | | |
|---|---|---|---|
| CC-5-V | 9.00% | cp. | 71° C. |
| BCH-52FF | 4.00% | $\Delta n$ | 0.085 |
| CCP-21FF | 10.00% | $\Delta \epsilon$ | -3.6 |
| CCP-31FF | 4.00% | | |
| CCP-302FF | 13.00% | | |
| CCP-502FF | 12.00% | | |
| PCH-302FF | 14.00% | | |
| PCH-502FF | 13.00% | | |
| CCH-34 | 9.00% | | |
| PCH-53 | 9.00% | | |
| PCH-301 | 3.00% | | |

EXAMPLE 3

A liquid crystal mixture is prepared which comprises

| | | | |
|---|---|---|---|
| CC-5-V | 10.0% | cp. | 70° C. |
| PCH-302FF | 14.0% | $\Delta n$ | 0.0832 |
| PCH-502FF | 13.0% | $n_e$ | 1.5622 |
| CCP-302 FF | 11.5% | $\Delta \epsilon$ | -3.6 |

-continued

| CCP-502 FF | 9.0% | $\epsilon_\parallel$ | 3.7 |
| CCP-21FF | 9.0% | | |
| CCP-31FF | 14.0% | | |

EXAMPLE 4

A mixture is prepared which comprises

| CC-V-V1 | 24.0% | Clearing point: | 88.5° C. |
| PCH-302FF | 12.0% | S,N | < -20° C. |
| PCH-502FF | 12.0% | $\gamma_1$ [mPa · s; 20° C.]: | 156 |
| CCP-302FF | 14.0% | $\Delta n$ [589 nm; 20° C.]: | +0.0896 |
| CCP-502FF | 13.0% | $n_e$ [589 nm; 20° C.]: | 1.5678 |
| CCP-21FF | 13.0% | $\Delta\epsilon$ [1 kHz; 20° C.]: | -4.0 |
| CCP-31FF | 12.0% | $\epsilon_\parallel$ [1 kHz; 20° C.]: | 3.6 |
| | | $V_o$ | 2,31 V [Cap.] |

From the foregoing description, one skilled in the art can easily ascertain the essential characteristics of this invention and, without departing from the spirit and scop thereof, can make various changes and modifications of the invention to adapt it to various usages and conditions.

What is claimed is:

1. Liquid-crystalline medium based on a mixture of polar compounds having negative dielectric anisotropy, which contains at least one compound of formula I

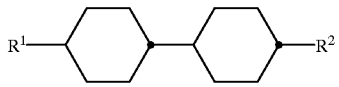

and at least one compound of formula II

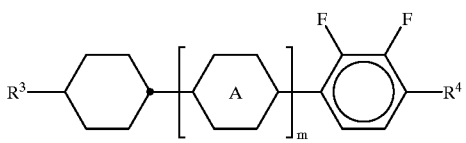

wherein $R^1$ is alkyl or alkoxy with 1 to 8 C atoms or alkenyl with 2 to 7 C atoms $R^2$ is alkenyl with 2 to 7 C atoms, $R^3$ and $R^4$ are each independently alkyl or alkoxy with 1 to 8 C atoms,

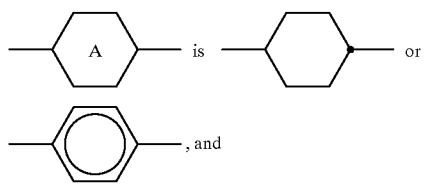

m is 0 or 1.

2. Medium according to claim 1, characterized in that it additionally contains at least one compound of the formula III:

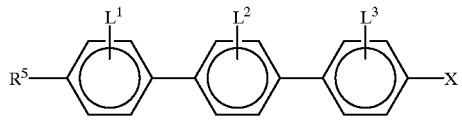

in which $R^5$ has the meaning given for $R^3$ or $R^4$ in formula II, $L^1$ to $L^3$ are each independently H, F or Cl, and X is F or Cl.

3. Medium according to claim 1, characterized in that it additionally contains one or more compounds of the formula IV:

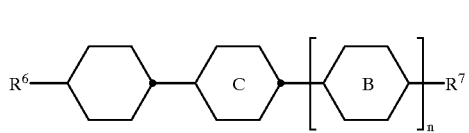

in which $R^6$ and $R^7$ are each independently alkyl or alkoxy with 1–8 C atoms,

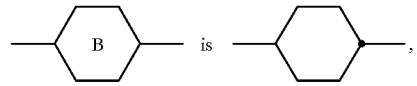

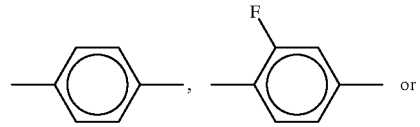

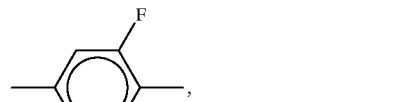

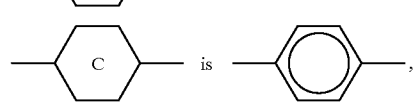

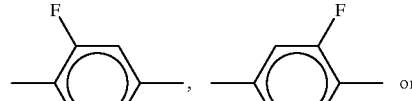

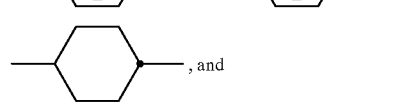

n is 0 or 1.

4. Medium according to claim 1, characterized in that it essentially comprises four or more compounds selected from the formulae I and II.

5. Medium according to claim 4, characterized in that it further comprises at least three compounds of the formula IV

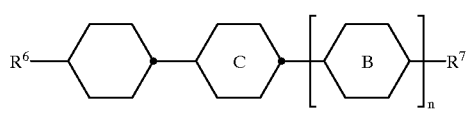
IV in which

R⁶ and R⁷ are each independently alkyl or alkoxy with 1–8 C atoms,

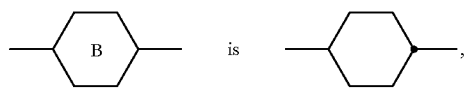

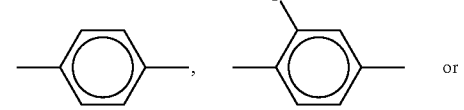

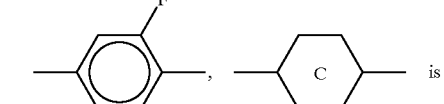

n is 0 or 1.

6. Medium according to claim 4, characterized in that it additionally contains at least one compound of the formula III

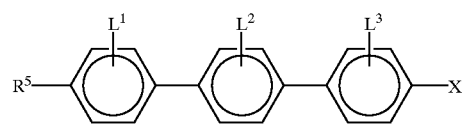
III in which

R⁵ has the meaning given for R³ or R⁴ in formula II,

L¹ to L³ are each independently H, F or Cl, and

X is F or Cl.

7. Medium according to claim 1, characterized in that it contains at least one compound I wherein R¹ and/or R² is vinyl or 1E-propenyl.

8. Liquid-crystalline medium according to claim 1, characterized in that it contains at least one compound selected from the formulae 1a to 1h:

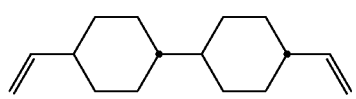
Ia

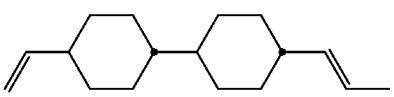
Ib

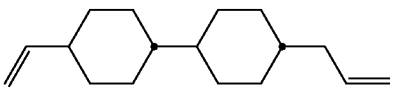
Ic

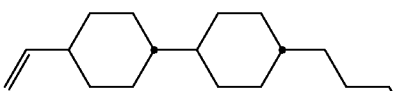
Id

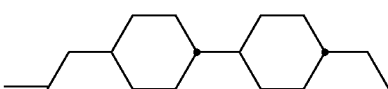
Ie

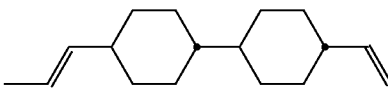
If

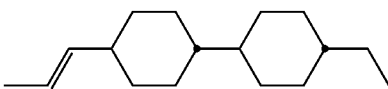
Ig

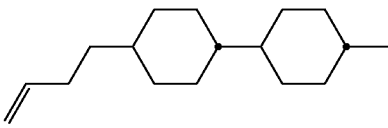
Ih

9. Medium according to claim 1, characterized in that it contains at least one compound of formula I wherein R² is vinyl or 1E-propenyl.

10. Liquid-crystalline medium according to claim 1, characterized in that it contains at least 3 compounds selected from the formulae IIa to IIe

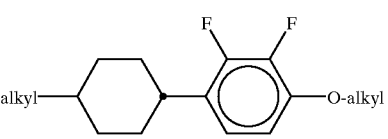
IIa

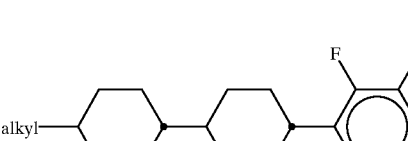
IIb

-continued

IIc
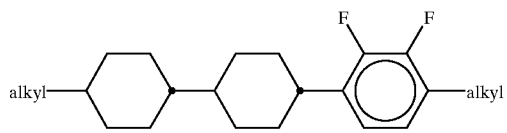

IId
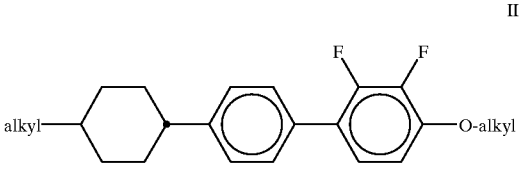

IIe
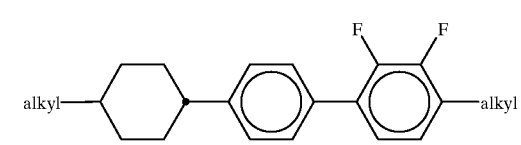

in which alkyl is $C_{1-6}$-alkyl.

11. Liquid-crystalline medium according to claim 10, characterized in that it contains at least one compound of the formula IIa and at least one compound of the formula IIb and/or IIc.

12. Medium according to claim 1, characterized in that it further contains at least one compound selected from the formulae IVa to IVd IVa

IVb

IVc

IVd
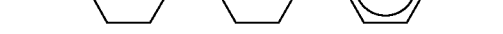

wherein alkyl is $C_{1-6}$-alkyl, R is $C_{1-6}$-alkyl or alkoxy and L is H or F.

13. Medium according to claim 1, characterized in that it further contains at least one compound selected from formulae IIIa to IIId IIIa

IIIb

IIIc
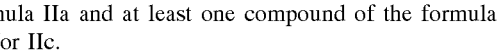

IIId
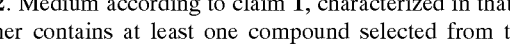

wherein alkyl is $C_{1-6}$-alkyl, L is H or F and X is F or Cl.

14. Electro-optical display having active matrix addressing based on the ECB effect, characterized in that it contains, as dielectric, a liquid-crystalline medium according to claim 1.

15. Display according to claim 14, characterized in that it is a projection display.

16. Medium according to claim 1, characterized in that it comprises four or more compounds selected from the formulae I and II.

17. Medium according to claim 16, characterized in that it further comprises at least three compounds of the formula IV IV

in which $R^6$ and $R^7$ are each independently alkyl or alkoxy with 1–8 C atoms,

-continued

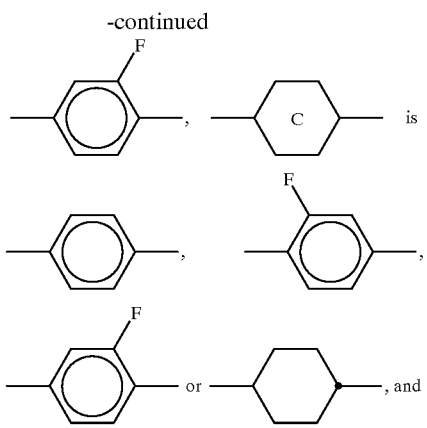

n is 0 or 1.

18. Medium according to claim 16, characterized in that it additionally contains at least one compound of the formula III

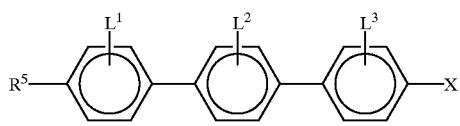

in which $R^5$ has the meaning given for $R^3$ or $R^4$ in formula II, $L^1$ to $L^3$ are each independently H, F or Cl, and X is F or Cl.

19. Medium according to claim 1, characterized in that it further contains at least three compounds selected from the formulae IVa to IVd

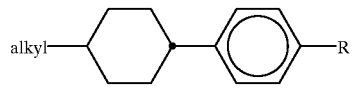

IVa

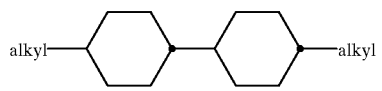

IVb

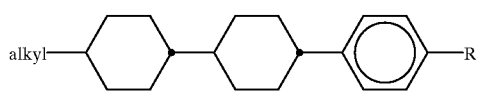

IVc

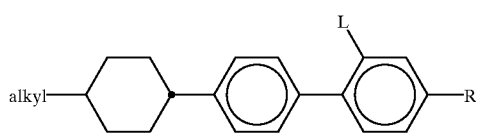

IVd wherein alkyl is $C_{1-6}$-alkyl, R is $C_{1-6}$-alkyl or alkoxy and L is H or F.

* * * * *